July 8, 1969  E. DUNKELIS  3,454,040

PRESSURE RESPONSIVE VALVE DEVICE

Filed March 24, 1967  Sheet 1 of 3

INVENTOR: EVALD DUNKELIS
by Charles S. McGuire
ATTORNEY

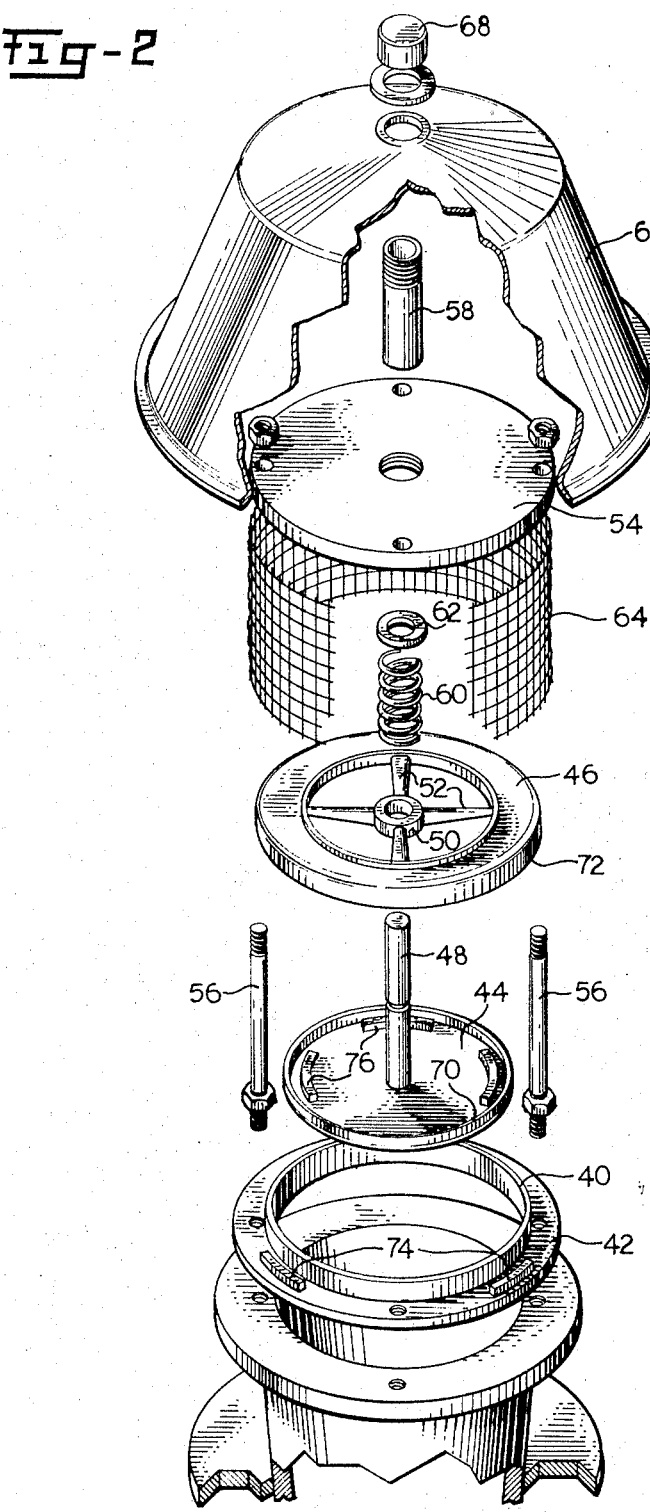

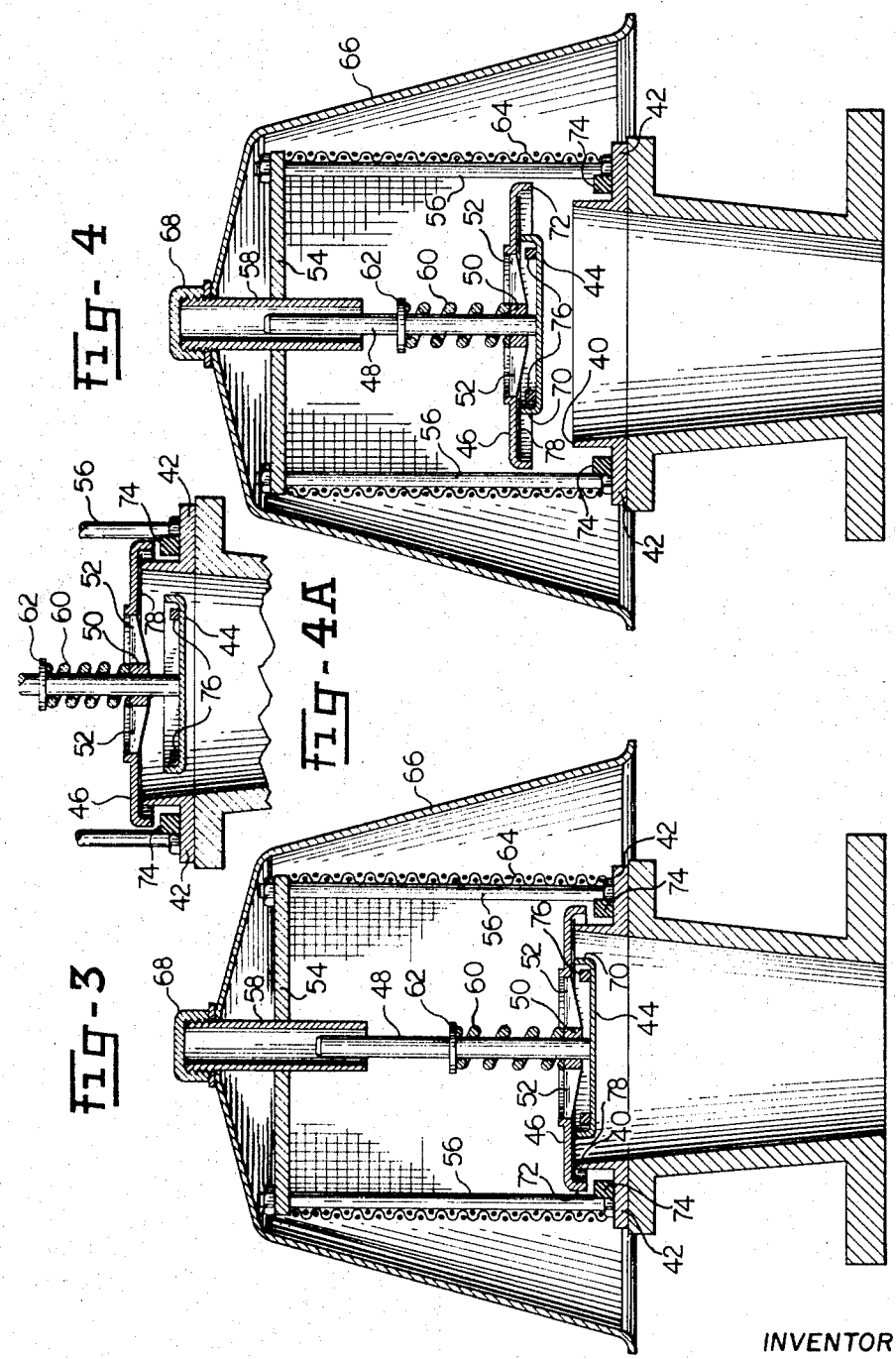

United States Patent Office 3,454,040
Patented July 8, 1969

3,454,040
PRESSURE RESPONSIVE VALVE DEVICE
Evald Dunkelis, 362 Hawthorne St.,
Glen Ellyn, Ill. 60137
Filed Mar. 24, 1967, Ser. No. 625,758
Int. Cl. F16k 17/10, 31/08
U.S. Cl. 137—491                                          4 Claims

ABSTRACT OF THE DISCLOSURE

A relief valve having a pallet normally held in the closed position by the attractive force of permanent magnet means and movable to the open position by a predetermined pressure differential. The flux gap is increased, thereby decreasing the magnetic biasing force, during opening movement and the pallet is returned to the closed position by weight and/or spring loading after a predetermined decrease in the pressure differential.

---

The present invention relates to pressure responsive relief valves, and more particularly, to novel means for biasing the pallets of such valves in the closed position.

It is a common practice to provide relief valves in association with enclosed storage tanks wherein the pressure is subject to rather wide fluctuations which might otherwise cause damage to the tanks. For example, in the storage of petroleum products the pressure within the storage tank is sometimes considerably above and sometimes below the surrounding atmospheric pressure. Although it is necessary to maintain such tanks in a normally sealed condition to prevent undesirable loss of petroleum vapors, it is likewise necessary to provide some means for relieving conditions of excess vacuum or overpressure so that the tank will not be ruptured or otherwise damaged thereby. To this end, the tanks are provided with vent openings defined by valve seats having pallets movable between open and closed positions with respect to the seats. Some means are provided for biasing the pallets in their closed position so that a predetermined pressure exerted thereon from either inside or outside the tank, depending upon whether the pallet is used to relieve vacuum or overpressure, will overcome the biasing force and move the pallets to their open position. Such valves may be actuated either directly, i.e., by exposing opposite sides of the pallet directly to tank pressure and atmospheric pressure, or indirectly, such as through the aid of a pilot valve. The present invention, as will be apparent from the following description, is equally applicable to the structures of both direct and pilot operated valve devices.

It is desirable for the pallet of a pressure responsive relief valve to remain in tightly sealed engagement with the valve seat until the predetermined critical pressure differential necessary to actuate the pallet has been reached. When this condition occurs, the pallet should move quickly to the fully open position and remain open until the pressure differential has decreased to a desired level. Among the more common means employed to bias relief valve pallets in their closed position are weight loading and spring loading. In the case of weight loading, the biasing force of the weight tending to move the pallet towards its closed position remains constant regardless of the position of the pallet. In the case of spring loading, the biasing force is usually increased as the pallet moves toward the open position since the spring is being flexed against the direction in which it is biasing the pallet. Solenoid operated valves, and other such devices, have been employed to vary the biasing force urging the pallet toward movement in one direction or another, but are more expensive and complicated in that they require an outside power source or means other than the pressure differential between the tank and the atmosphere in order to actuate the valve.

The present invention provides an improved valve of the above described type by utilizing the attractive force between a permanent magnet and a magnetically permeable material to bias the pallet in the closed position. Either the permanent magnet or the material attracted thereby is associated with, or forms a part of, the valve pallet and is movable therewith. The other of the magnet and attracted material is positioned in proximity to the first when the pallet is in the closed position, as by being associated with the valve seat, and remains stationary as the pallet moves. The biasing force is at a maximum when the pallet is in the closed position and decreases rapidly due to the increase in flux gap as the pallet opens. The initial biasing force may be easily and accurately controlled through proper selection of the size and number of magnets and adjustment of the initial flux gap. Additional biasing means, which may be of the more conventional weight or spring loading type, are also provided in order to move the pallet back to the closed position after the pressure differential has decreased to the desired amount. Proper selection of such additional biasing means will allow the pallet to be returned to its closed position at virtually any desired pressure differential.

It is a principal object of the present invention to provide a novel relief valve operable in response to a predetermined pressure differential and including permanent magnetic means for exerting an attractive, biasing force directly on the pallet, tending to hold the latter in the closed position by a greater amount when the valve is fully closed than when it is moved away from the closed position.

It is another object to provide a relief valve of substantially the same order of complexity and expense as prior art valves, but which has superior operating characteristics.

A further object is to provide a novel relief valve structure especially suited to both vacuum and overpressure relief wherein the pressure differential between the tank and the outside atmosphere may be decreased by a much greater amount without the use of a pilot valve.

A still further object is to provide a relief valve pallet and associated valve seat of extremely simple and inexpensive design which may be accurately controlled in the degree of pressure differentials required to move the pallet between its open and closed positions with respect to the valve seat.

Other objects of the invention will in part be obvious and will in part appear hereinafter.

The invention accordingly comprises the features of construction, combination of elements and arrangement of parts which will be exemplified in the construction hereinafter set forth, and the scope of the invention will be indicated in the claims.

FIG. 2 is an exploded perspective view of a second type of valve wherein the present invention may be utilized;

FIGS. 3 and 4 are elevational views in section, of the device of FIG. 2 shown in different positions of operation;

FIG. 4A is a fragmentary view of a portion of the device of FIGS. 3 and 4 in still another position.

Figure 1A:
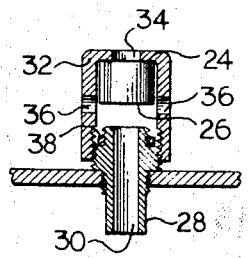
FIG. 1A shows a fragment of the device of FIG. 1 with a portion thereof in a second position.
Figure 1:
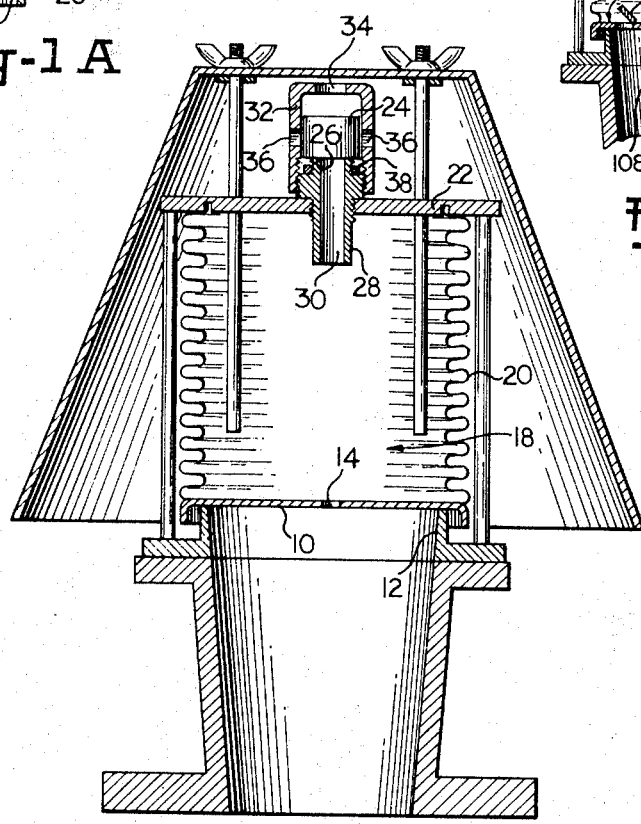
FIG. 1 is an elevational view in vertical section of a first type of relief valve embodying the present invention.

The invention may be incorporated in a variety of ways with pressure responsive fluid flow control devices. For example, the features with which the present invention is concerned may be incorporated in the pilot portion of a pilot operated relief valve. Such a structure is shown in FIG. 1, wherein the main valve portion and pressure chamber, by way of example, correspond to the novel valve structure disclosed in copending application Ser. No. 600,114, filed Dec. 8, 1966 by the present inventor. In this device, main pallet 10 is vertically movable between open and closed positions with respect to valve seat 12 for relieving an excess pressure condition within an enclosed tank with which the opening defined by the valve seat communicates. Opening 14 is provided in a centrally disposed portion of main pallet 10, whereby the interior of the tank communicates with pressure chamber 18 defined by flexible bellows 20. The bellows has a generally cylindrical shape with the usual convoluted wall providing axial flexibility. Bellows 20 is closed at one end by sealing thereof to main pallet 10, and is likewise sealed at the other end to stationary upper wall 22.

The pilot portion of the valve includes pallet 24 movable between covering and uncovering positions (shown in FIGS. 1 and 1A, respectively) with respect to pilot seat 26, which forms one end of tube 28 extending through upper wall 22. Opening 30 extends through tube 28, whereby the pressure within chamber 18 is exerted on the lower side of pilot pallet 24. Cap 32 substantially encloses pallet 24 and serves as a guide as the pallet moves vertically. Opening 34 is provided in the top of cap 32 so that the air may be expelled from the upper interior of the cap as pallet 24 moves upwardly. One or more openings 36 are provided in the sides of cap 32 for the venting of gas within chamber 18 when pallet 24 is in the open or uncovering position with respect to seat 26.

In addition to its own weight which, of course, may be designed to provide the desired weight loading, pallet 24 is biased in the covering position by magnetic attraction. The magnetic attraction is provided between the movable pallet member and a stationary member. For example, the pallet itself may be formed from a permanently magnetized material and the valve seat may be formed of a material attracted by the permanent magnet. Alternatively, the valve seat may be fabricated of a material which is not attracted by the permanent magnet of pallet 24, but rather an additional element 38 of magnetically permeable material, is associated with the valve seat.

In the embodiment illustrated in FIG. 1, magnetically permeable material 38 is provided in the form of a ring which is threaded on the outside of tube 28. The ring could equally well be threaded on the inside of cap 32, of course, or could comprise one or more individual elements affixed to tube 28, cap 32, or any other means maintaining the material in the desired relation to pallet 24. Likewise, the stationary means (valve seat 26, material 38, etc.) could comprise the permanently magnetized material, and the magnetically permeable material attracted thereby associated with movable pallet 24. Providing material 38 in the form of a ring threaded on tube 28 or cap 32 allows easy and rapid adjustment of the flux gap between the material and pallet 34, thereby adjusting the degree of magnetic biasing force tending to hold pallet 24 in the closed position. Of course, the pallet and material may be in direct contact when the pallet is closed, if desired, thereby providing the maximum biasing force available by adjustment of flux gap.

Operation of the valve device of FIG. 1 will now be described. As the pressure within the enclosed tank increases, the pressure within chamber 18, which is exerted on the lower side of pilot pallet 24, increases. Main pallet 10 will remain closed since the pressure on opposite sides thereof is substantially the same. When the pressure on the lower side of pallet 24 sufficiently exceeds the atmospheric pressure on the upper side of the pallet to overcome both the magnetic biasing force and the weight of the pallet (assuming the latter to be mounted for downward movement to the closed position) the pallet will begin to lift off valve seat 26. Any movement of pallet 24 will increase the flux gap between the permanently magnetized material and the magnetically permeable material attracted thereby. This, of course, will decrease the degree of magnetic attraction tending to hold the pallet in the closed position, thereby allowing extremely rapid movement of the pallet to the fully open position; shown in the fragment of FIG. 1A. This allows the gas or vapor within chamber 18 to be vented to the atmosphere through openings 30 and 36. These openings are intentionally somewhat larger than opening 14 through which gas enters chamber 18 from the tank. Thus, the pressure within chamber 18 will drop rapidly, causing main pallet 10 to be moved to the open position when the pressure differential on opposite sides thereof is sufficient to overcome the loading or downward biasing force thereon.

The latter may be provided by the weight of the pallet, or other elements associated therewith, by the spring rate of bellows 20 or other additional springs, or by magnetic biasing as in the case of the pilot pallet. The pressure of gas vented through the pilot valve necessary to maintain the latter in the open position is much less, of course, than the pressure required initially to move the pallet away from its closed position, whereby the main pallet will remain open to vent the tank until a quite substantial decrease in pressure differential has taken place. This is directly controlled by the degree of magnetic biasing force and the amount of weight loading on pallet 24.

FIG. 2 illustrates in exploded perspective view another type of valve device wherein the present invention may be employed. As explained more fully later herein this device is designed to prevent damage to the tank with which it is associated due to either excess pressure or vacuum within the tank. Valve seat 40 is formed from the edge of a lip extending upwardly from flange 42 and defines an opening communicating with the interior of the tank. The present embodiment is not a pilot operated device, but rather includes two main pallets 44 and 46. Rigidly extending from pallet 44 is stem 48 which passes through an opening in hub 50. The latter is supported by spokes 52 which extend radially across the open center of pallet 46. Circular plate 54 is supported by guide rods 56 which extend vertically from anchored positions on flange 42. Plate 54 serves as a support for hollow tube 58, into which one end of stem 48 extends. Coil spring 60 loosely encircles stem 48 and is retained between hub 50 of pallet 46 and ring 62 which is rigidly affixed to stem 48 of pallet 44.

Additional elements may be provided in the usual manner, as is conventional for valves of this type. For example, cylindrical screen 64 may extend around guide rods 56 between plate 54 and flange 42 so that objects too large to pass through the screen cannot be deposited on pallets 44 and 46. Also, hood 66 may be supported by tube 58, which in turn is covered by cap 68, to afford some protection from damage by the weather or other exterior causes.

Pallet 44 is provided with an upwardly extending peripheral lip 70, and pallet 46 with a downwardly extending peripheral lip 72. Lip 72 has a circumference larger than that of valve seat 40 so that lip 72 surrounds the valve seat when the latter is in engagement with the lower surface of pallet 46. Lip 70 has a diameter somewhat smaller than valve seat 40, but larger than the open central portion of pallet 46, whereby pallet 44 may fit inside valve seat 40 with lip 70 in engagement with the lower surface of pallet 46 which thereby, in effect forms a seat for pallet 44 to seal off the opening defined by the central portion of pallet 46. One or more permanent magnets 74 are attached to flange 42 so as to be positioned adjacent lip 72 when pallet 42 is engaged with valve seat 40. Likewise, permanent magnets 76 are attached in predetermined size and number to the upper surface of pallet 44 so as to be adjacent at least a portion of pallet 46 when pallet 44 is in engagement therewith.

The manner of assembly and operation of this embodiment of the invention may be seen more clearly with reference to FIGS. 3–4A. In FIG. 3 the elements are shown in the fully closed position; that is, both pallets 44 and 46 are seated so that the interior of the tank is sealed off from the outside atmosphere. It will be seen that both pallets 44 and 46 are necessary to close the opening defined by valve seat 40. Although pallet 46 is large enough to engage seat 40 in sealing relationship, pallet 44 is necessary to close the central opening in pallet 46. A ring shaped diaphragm 78, made of a flexible material in conventional manner, may be provided on the lower surface of pallet 46 to provide a better seal when valve seat 40 and/or lip 70 are engaged therewith.

Pallet 46 is constructed of any suitable magnetically permeable material, whereby it is biased in the position of FIG. 3 by its own weight and the weight of the elements which it supports, and by the attraction between permanent magnets 74 and lip 70. Pallet 44 is held in the closed position of FIG. 3 by the upward biasing force exerted by spring 60 on ring 62 of stem 48, and by the attraction between permanent magnets 76 and pallet 46.

In FIG. 4 the elements are shown in the open position for relieving overpressure within the tank. As this pressure increases it exerts an upward force on a portion of the lower surface of pallet 46 and on pallet 44, the latter force being transmitted to pallet 46. When the tank pressure on the lower surfaces of pallets 44 and 46 sufficiently exceeds the atmospheric pressure on the upper surfaces to overcome both the weight of the movable elements and the magnetic attraction between magnets 74 and lip 70, both pallets will be lifted. As soon as pallet 46 begins to move the flux gap between magnets 74 and lip 70 is increased, thereby decreasing the force of magnetic attraction tending to hold pallet 46 in the closed position. This means that once the pallet is moved through a small distance by pressure within the tank it will be rapidly moved to the fully open position and may be held in this position by a pressure much less than that required initially to move the pallet away from the closed position.

Pallet 44 remains closed, of course, since the pressure exerted thereon is upward. When the pressure within the tank has been reduced to a level below that required to support the weight of the movable elements, pallet 46 will again drop into engagement with valve seat 40 and be retained by the magnetic attraction as well as by force of gravity. Stem 48 riding in hollow tube 58, and guide rods 56 surrounding pallet 46, insure proper vertical movement between the open and closed positions.

The fragmentary elevational view of FIG. 4A illustrates the position of the elements to relieve a condition of excessive vacuum or negative pressure within the tank. Pallet 44 will be moved downwardly by atmospheric pressure when the latter sufficiently exceeds tank pressure to overcome both the biasing force of spring 60 and the attraction between permanent magnets 76 and pallet 46. The spring rate of spring 60 is preferably so chosen that the decrease in the force of magnetic attraction upon initial movement of pallet 44 results in a significant net decrease in the amount of force required to move pallet 44 to the fully open position. Pallet 44 will remain in the open position of FIG. 4A until tank pressure is increased to the point that the upward biasing force exerted by spring 60 on ring 62 will move pallet 44 upwardly against the atmospheric pressure, thereby returning the pallet to the closed position of FIG. 3. Proper alignment of pallet 44 is maintained during movement thereof between the open and closed positions by stem 48 passing through hub 50 and within tube 58.

The amount of reduction in pressure differential during the time either of pallets 44 and 46 are in the open position is controlled by the degree of magnetic attraction exerted on each pallet while in the closed position and the degree of the second biasing force exerted on each pallet while in the open position; i.e., the spring loading of pallet 44 and the weight loading of pallet 46. Such forces are established by design features in a manner readily apparent to those skilled in the art. The design may be such, for example, that a much larger reduction in pressure differential is achieved than in former breather valves where the pallets were actuated directly by tank pressure, without the aid of pilot valves.

Figure 5:
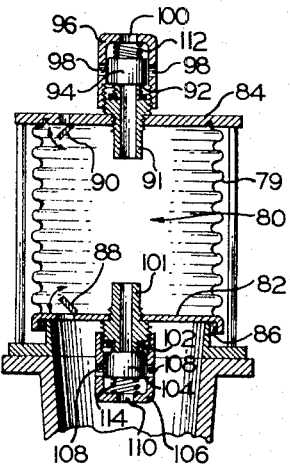
FIG. 5 is a somewhat diagrammatic view of another embodiment.

In FIG. 5 is shown still another embodiment of the invention wherein pilot operation is provided for both pressure and vacuum operation of a single main pallet. Since the operation of the FIG. 5 embodiment should be easily understood from the more detailed showing of the previous embodiments, it is shown and described in a more diagrammatic manner. Again, bellows 79 forms an enclosed pressure chamber 80 and is sealed at its opposite ends to movable main pallet 82 and stationary end wall 84. Main pallet 82 is vertically movable between covering and uncovering positions with respect to valve seat 86 which defines an opening communicating with the interior of the tank with which the valve device is associated.

In this embodiment, main pallet 82 includes check valve 88, which is shown diagrammatically since it may comprise any of a number of well known designs suited for this purpose. Check valve 88 is opened by pressure from below, i.e., from within the tank, and closed by a positive pressure from above or negative within the tank. Likewise, end wall 84 includes check valve 90, which is opened by atmospheric pressure when the latter exceeds the pressure within chamber 80, and closed by pressure within chamber 80 when such pressure exceeds atmospheric.

As in the FIG. 1 embodiment, end wall 84 includes an opening with hollow tube 91 extending therethrough. One end of the tube defines a valve seat 92 with pilot pallet 94 movable between covering and uncovering positions with respect thereto. Pallet 94 is constructed from a permanently magnetized material and is biased in the closed position by attraction between the magnet and valve seat 92. Any of the previously described arrangements of magnets and magnetically permeable may, of course, be used. Pallet 94 is enclosed by cover 96 having side openings 98 and upper opening 100 therein for the same purposes as the similar portions of the FIG. 1 embodiment. In the present embodiment an opening is also provided in main pallet 82 through which hollow tube 101 extends, having one end defining a valve seat 102. Pallet 104 comprises a permanent magnet attracted by valve seat 102 and movable with respect thereto. Cover 106, having openings 108 and 110, serves a purpose previously described. The size of the pilot portions of the device may, of course, be greatly exaggerated with respect to the other elements since the showing is intended to be diagrammatic.

In operation of the present embodiment under conditions of excess pressure within the tank, check valve 88 will be opened and check valve 90 closed as the pressure increases within the tank, and therefore within chamber 80. When this pressure has reached predetermined value pallet 94 will be lifted off valve seat 92 and the gas within chamber 80 will escape through openings 98 at a rate greater than at which additional pressurized gas can enter chamber 80 through check valve 88. Thus, the pressure within chamber 80 will drop rapidly and main pallet 82 will be lifted by pressure from below to vent the tank to the atmosphere. In this embodiment a light spring 112 has been added to absorb a portion of the force as pallet 94 is lifted off valve seat 92.

When pressure within the tank falls below atmospheric pressure check valve 88 will be closed and check valve 90 may be opened if the pressure within chamber 80 is initially below atmospheric. When the differential between atmospheric pressure within chamber 80 and the pressure within the tank is great enough pallet 104 will be forced away from valve seat 102. The air within chamber 80 may then enter the tank through openings 108 at a rate faster than additional air can enter through check valve 90, thereby causing the pressure within chamber 80 (i.e., the pressure above main pallet 82) to drop below atmospheric. Therefore, the atmospheric pressure acting upwardly on main pallet 82 outside of valve seat 86 will cause the main pallet to lift and vent the tank to the atmosphere. Support spring 114 is provided so that pallet 104 will be returned to the closed position after a sufficient reduction in the pressure differential on opposite sides of main pallet 82.

The constructional details and manner of operation of the present invention should be apparent from the foregoing description. Of special note is the fact that the biasing force of the magnetic attraction is exerted directly on the movable pallet member, upon which tank pressure is also exerted to cause operation of the valve. In this manner, the desirable result may be obtained of having a pallet member requiring a predetermined force for initial movement away from the closed position, but a far smaller force for continued movement to and retention in the fully open position. The amount of magnetic biasing force for a given device may be controlled within very close limits by proper design of the opposing area of the magnets and the material attracted thereby and the flux gap. The latter may easily be made adjustable so that the biasing force may be selectively varied.

It is also to be noted that the device of the invention, while offering a number of operational advantages, is not significantly more complicated or expensive than similar prior art valves. In fact, most of the elements of the invention may be constructed exactly the same as in other valve devices. Constructing the valve pallet of permanently magnetized material and the seat of a material attracted thereby, for example, allow a construction which may be virtually identical with previously known designs in the size, shape and position of the individual elements.

Having described my invention, what I claim as new and desire to secure by Letters Patent is:

1. A pilot operated, pressure responsive relief valve having a main pallet movable between covering and uncovering positions with respect to a main valve seat defining an opening communicating with the interior of an enclosure to be vented by said relief valve and comprising, in combination:
    (a) means defining an enclosed chamber;
    (b) said main pallet forming a partition between said enclosed chamber and the interior of said enclosure;
    (c) means for mounting said main pallet for movement from said covering to said uncovering position when the pressure in said enclosure exceeds the pressure in said chamber by a predetermined amount;
    (d) an annular pilot valve seat of magnetically permeable material defining an opening through which the interior of said chamber communicates with the atmosphere;
    (e) a substantially cylindrical slug of permanently magnetized material movable from a covering position, wherein it is biased by the attracting force between said permanently magnetized slug and said magnetically permeable pilot valve seat, and an uncovering position with respect to said pilot valve seat in response to a fluid pressure within said chamber sufficient to overcome said attracting force;
    (f) guide means constraining movement of said cylindrical slug in a predetermined path; and
    (g) secondary biasing means exerting a force on said cylindrical slug sufficient to move the latter from its uncovering to its covering position with respect to said pilot valve seat in response to a predetermined drop in fluid pressure within said chamber.

2. The invention according to claim 1 wherein said cylindrical slug is constrained for upward movement to said uncovering position and downward movement to said covering position, and said secondary biasing means comprise weight loading of said slug.

3. The invention according to laim 1 wherein said guide means comprises a housing enclosing said slug and said pilot valve seat, and having at least one opening therein for venting fluid from said chamber through said pilot valve seat and said housing to the atmosphere.

4. The invention according to claim 3 wherein said housing has an inside diameter which provides a small clearance between the corresponding outside diameter of said cylindrical slug, and said housing includes an additional opening near the top to allow direct venting of the gas forced upwardly by movement of said slug to its uncovering position.

References Cited

UNITED STATES PATENTS

| | | | |
|---|---|---|---|
| 1,342,985 | 6/1920 | Cash | 137—493.4 |
| 2,708,944 | 5/1955 | Modine | 251—65 XR |
| 2,938,540 | 5/1960 | Schatzman et al. | 251—65 XR |
| 3,189,675 | 6/1965 | Moore et al. | 251—65 XR |
| 3,199,524 | 8/1965 | Mitchell | 251—65 XR |
| 3,307,575 | 3/1967 | Dickinson et al. | 137—491 |

M. CARY NELSON, *Primary Examiner.*

ROBERT J. MILLER, *Assistant Examiner.*

U.S. Cl. X.R.

137—493.4; 251—65